United States Patent [19]

Allen

[11] Patent Number: 4,492,341

[45] Date of Patent: Jan. 8, 1985

[54] PORTABLE HAND-HELD MATERIAL BROADCASTING DEVICE

[75] Inventor: Francis F. Allen, Moraga, Calif.

[73] Assignee: Bermuda Research Corp., Orinda, Calif.

[21] Appl. No.: 461,943

[22] Filed: Jan. 28, 1983

[51] Int. Cl.$^3$ .............................................. A01C 17/00
[52] U.S. Cl. .................................... 239/686; 222/317; 222/473
[58] Field of Search ....................... 239/686, 525, 526; 251/284, 294; 222/470, 472, 473, 474, 79, 317, 323, 505

[56] References Cited

U.S. PATENT DOCUMENTS

| | | | |
|---|---|---|---|
| 809,895 | 1/1906 | Beazley | 251/284 |
| 3,157,402 | 11/1964 | Love, Jr. | 239/686 |
| 3,227,461 | 1/1966 | Love | 239/686 |

*Primary Examiner*—Andres Kashnikow
*Assistant Examiner*—James R. Moon, Jr.
*Attorney, Agent, or Firm*—Manfred M. Warren; Robert B. Chickering; Glen R. Grunewald

[57] ABSTRACT

A portable hand-held material broadcasting device having a housing with a manually engageable handle and providing a storage chamber for flowable granular material superimposed over a normally horizontally rotating impeller for gravitational flow of material from the chamber to the impeller, a valve member movable to regulate the material flow and having closed, intermediate and full open positions, a manually displaceable actuating member positioned adjacent the handle and having a connection to the valve member for displacement thereof, and a manually adjustable cam member for limiting the opening movement of the valve member and corresponding position of the actuating member for setting the rate of flow of the material, the improvement of the invention including a stop mounted on the handle and positioned to engage and support the actuating member when moved to its full open position, and a special connection being made between the actuator member and the valve member to permit forced displacement of the actuator member to the stop without damage to the connection when the valve opening cam member is set in an intermediate valve open position.

2 Claims, 6 Drawing Figures

U.S. Patent   Jan. 8, 1985   4,492,341
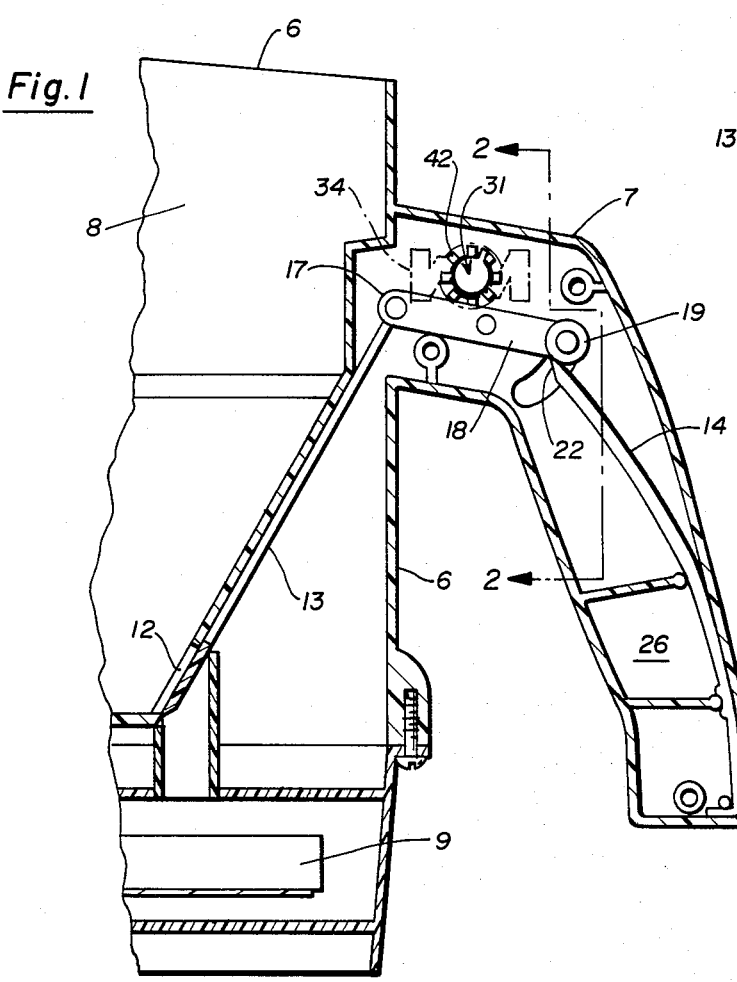
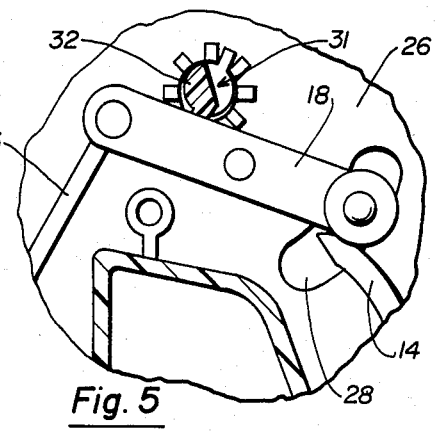
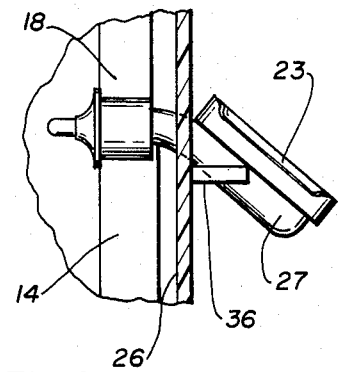
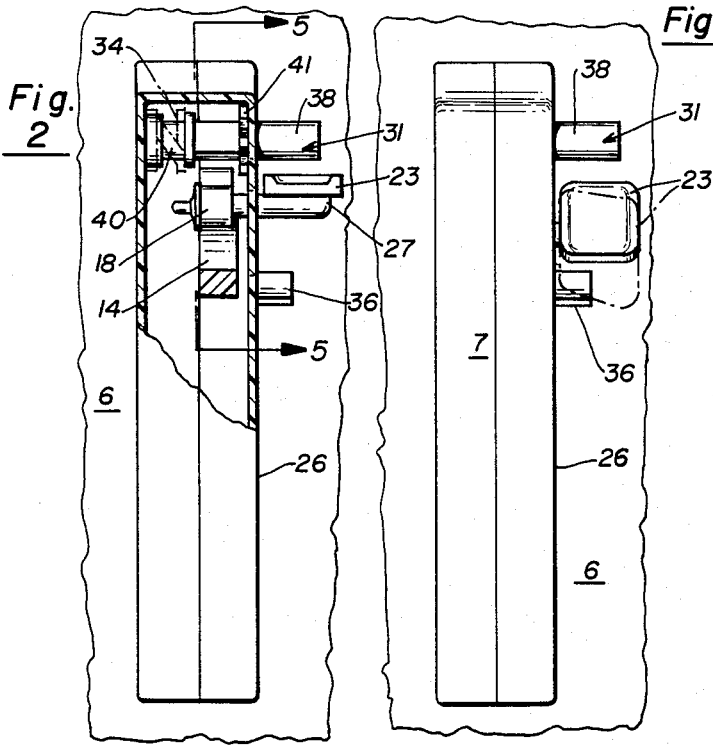
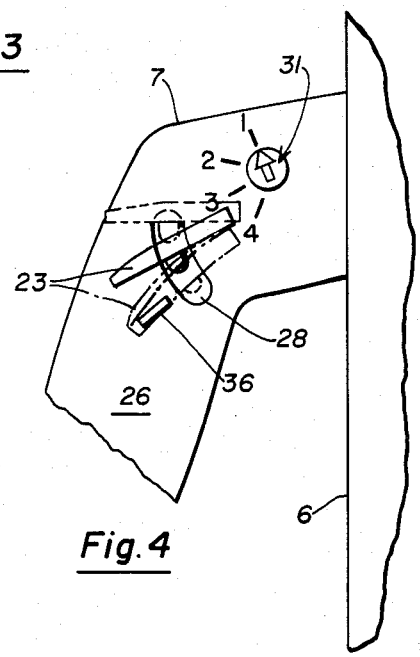

PORTABLE HAND-HELD MATERIAL BROADCASTING DEVICE

BACKGROUND OF THE INVENTION

The invention relates to devices for spreading and broadcasting materials such as pellet fertilizers, seeds, and the like and more particularly is directed to improvements in a hand-held material broadcasting device of the type disclosed in U.S. Pat. Nos. 3,157,402 and 3,227,461, which patents represent the closest prior art known to applicant.

Devices of the character referred to have been in successful and widespread use. They comprise very briefly a relatively small portable housing having a manually engageable handle for convenient carrying about and proper positioning of the device when in use. The housing provides a storage chamber for flowable granular material such as fertilizer pellets, seeds or the like which is superimposed over a normally horizontally rotating impeller which functions to centrifically throw the material in a fan-shaped area extending from the front of the device and which can be readily directed by the user in the manual orientation of the device. A valve member regulates the flow of the material from the storage chamber to the impeller and has closed, intermediate and full open positions in which the flow of material to the impeller is cut off or regulated to the full flow capacity of the device. A manually displaceable member is positioned adjacent the handle and has a connection to the valve member to effect its displacement from closed position to its fully opened position against the action of a biasing spring normally moving the valve member to its closed position. The operator can select the desired volume output by a manually adjustable means which limits the opening of the valve member and the corresponding degree of movement of the actuating member. When this adjusting means is set to an intermediate output, the movement of the valve actuating member is interrupted, i.e., stopped, at the position corresponding to the desired position of the valve member regulating flow of material from the storage chamber to the impeller. Frequently, in the use of the device set in an intermediate output position, the operator will wish to at least momentarily increase the output flow. He may of course do this by resetting the aforementioned manually adjustable means. However, during operation both hands of the user are occupied, one holding the holding the handle of the device and directing the output spray of material, and the other hand is engaged with a crank driving the impeller. Accordingly, if the operator wishes to readjust the output flow, he need to momentarily release one hand from the crank in order to engage the flow adjustment means to permit further opening movement of the valve member. It has been found from experience, human nature being what it is, that the operator instead of momentarily stopping operation of the device, will try to force a greater flow by pushing harder on the manually displaceable actuating member connected to the valve member. The later, of course, in the design of the unit as above explained, is held against a further opening movement of the valve member by the manually adjustable means limiting the opening movement. In the preferred design the actuating member is disclosed for engagement and displacement by the thumb of the hand holding the handle, and where the operator has sufficient strength, he may in the situation described, bear down so hard on the actuating member as to break its connection to the valve member and thus render the whole device inoperative.

SUMMARY OF THE INVENTION

The structure of the present invention is designed to completely avoid the premature breakage of the device and frustration, without harm to the mechanism, due to the improper attempted operation above explained.

The present invention will accordingly very greatly extend the useful operation life of the material broadcasting device.

Another object of the present invention is to provide a portable hand-held material broadcasting device of the character described which preserves the low cost and large scale manufacturing advantages of having all of its essential elements formed from injection molded plastic parts.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

Referring to said drawings:

FIG. 1 is a fragmentary cross-sectional view of a portable hand-held material broadcasting device constructed in accordance with the present invention.

FIG. 2 is a fragmentary righthand elevation of the device partially broken away in section to show interior parts.

FIG. 3 is a view similar to FIG. 1 but with the operating parts in a different position.

FIG. 4 is a fragmentary side elevation of the device with the valve operating member in different positions.

FIG. 5 is an enlarged fragmentary cross-sectional view of a portion of the device, taken substantially on the plane of line 5—5 of FIG. 2.

FIG. 6 is an enlarged fragmentary cross-sectional view of FIG. 5.

DETAILED DESCRIPTION OF INVENTION

The present invention is for a portable hand-held material broadcasting device of the type disclosed in U.S. Pat. Nos. 3,157,402 and 3,227,461. These devices include a housing 6 having a manually engageable handle 7 and providing a storage chamber 8 for flowable granular material such as fertilizer pellets, seeds or the like, superimposed over a normally horizontally rotating impeller 9. Chamber 8 is formed with a bottom opening 12 for a gravitation flow of material from the chamber to the impeller, and a valve member 13 is mounted for reciprocation across opening 12 for regulating the material flow. Normally valve member 13 is biased to a closed position by a spring 14 fully closing off opening 12. Movement of valve member 13 to an intermediate or full-flow opening position is here controlled by the connection of valve member 13 to one end 17 of a lever 18 which has its opposite end 19 connected to a normally upper free end 22 of leaf spring 14 and also to a manually engageable and displaceable member 23 which is positioned adjacent to and on one side 26 of a handle 7. Member 23 is preferably formed as a flat, more or less rectangular, button especially shaped for engagement by the thumb of the hand grasping handle 7. Member 23 is accordingly, normally positioned generally horizontally when in use and has an integrally-formed stem 27 which extends through an arcuate slot 28 in handle side 26 for connection to lever end 19. Accordingly, depression of actuating member 23 will cause a clockwise rotation of lever 18, as viewed in FIGS. 1 and 5, against the resilient flexure of leaf-spring 14, an elevation of valve member 13 and an opening of the discharge opening 12. When the thumb actuating member 23 is not so engaged and displaced, spring 14 will urge a counterclockwise movement of lever 18, as viewed in FIGS. 1 and 5 and a downward displacement of valve member 13 to close off opening 12.

Normally, handle 7 will be clasped in the left hand of the user with the user's thumb coming to rest on member 23. This leads the right hand of the user free to engage an operating crank (not shown) at the righthand side of the device and which is connected by a gear train to impeller 9. For greater details in the showing of the crank and its operating connection to the impeller, reference is made to U.S. Pat. No. 3,227,461.

It is important that the operator has the opportunity of readily adjusting the output flow of the device so that the volume of material being broadcast and the area being covered may be easily controlled. This is accomplished in the present device by limiting the opening of valve member 13 to a series of intermediate positions and to a wide open position as indicated in positions marked 1 through 4 in FIG. 4 of manually adjustable means 31. This means here comprises a cam 32, best seen in FIG. 5, which is positioned for engagement with lever 18 and is formed on selective rotation to a series of positions marked 1 through 4 in FIG. 4 to limit the movement of lever 18 to positions corresponding to intermediate and full open positions of valve member 13. For example, in the number 1 position as illustrated in FIGS. 4 and 5, valve member 13 is raised only slightly from its fully closed position to permit a minimum flow of material through opening 12. The cam member 32 is formed such that on further rotation to positions 2, 3 and 4, as noted in FIG. 4, lever 18 will be permitted further rotation in a counterclockwise direction as seen in FIG. 1 to cause further displacement of valve member 13 to more open intermediate positions and finally in position 4 of member 31 to a fully opened position. Adjustment of cam member 32 is effected by pushing in on the outside handle portion 38 of the member against the resilient resistance of a leaf-spring 34 supporting the interior end 40 of the member, the displacement being sufficient to remove pins 41 on member 31 from behind a series of circumferentially-spaced detenting ribs or shoulders 42 molded at the interior side of handle wall 26. Thus freed from ribs 42, member 31 may be freely rotated to position 1, 2, 3 or 4. On release, the member will move outwardly under the urge of spring 34 to reposition pins 41 between other pairs of ribs.

A problem has arisen in the operation of previous devices with the flow adjustment member 31 set in one of the intermediate positions 1, 2 and 3 in that the operator will in certain situations try to increase the output flow and area covered by a forced displacement of member 23. Of course such an attempt is an improper use of the device since lever 18 is stopped by the particular setting of member 31 and such a forced momentary pressure on member 23 would cause, if a sufficient force was applied, a breaking off of member 23 and the rendering useless of the entire device.

To avoid the premature destruction of the device under the above circumstances, two important additions are made in the present device. One, a stop 36 is mounted on handle side 26 directly under actuator member 23 and in position to engage the actuator member when the latter is removed to its full valve opening position. Stop 36 will positively support the actuator member when it is in fully open position against any attempted further displacement in a downward, valve-opening direction. Secondly, stem 27 is formed of a material and is dimensioned to flex without breaking upon forces movement of the actuator member to stop 36 when cam member 31 is in one of its intermediate positions 1, 2 or 3, as seen in FIG. 4. The importance here is that the connection between member 23 and valve member 13 is resiliently yieldable to permit the forced displacement of member 23, when cam member 31 is in position 1, 2 or 3, as seen in FIG. 4, without damage to or breakage of the connection. The most extreme situation occurs when the flow adjustment member 31 is in its smallest valve opening position denoted as position 1 in FIG. 4. In such position member 23 may be readily moved to the positions shown in full lines in FIGS. 2, 3, 4, 5 and 6. In this position of member 31, cam 32 will intercept the movement of lever 18, as seen in FIG. 5, limiting the upward, opening position of valve member 13 to its minimal flow position. If the operator attempts to momentarily increase the flow output of the device by bearing down heavier on member 23, the latter will flex downwardly without breakage. As will be best seen in FIGS. 3, 4 and 6, if sufficient force is applied to member 23 it can forced all of the way down to stop 36 without breaking any of the parts. This is here best accomplished as above explained by forming stem 27 of a dimension and a material permitting this type of abusive action. As viewed in FIGS. 2 and 6 the total length of stem 27 extending from lever 18 and including a portion underlying and formed integrally with member 23 is in the order of twenty-eight thirty-seconds of an inch or about 22.2 millimeters. I have found that member 23 and its stem portion 27 may be preferably formed as an injection molded part of acetal a plastic product obtainable from E. I. DuPont deNemours & Co. under the trademark DELRIN from Celanese Corporation under the trademark CELCON. In the interest of strength, durability and ease and economy and manufacture, all of the smaller operating parts of the device may be similarly formed by injection molding from the same material. The housing, including its handle may also be advantageously formed by injection molding. Polypropylene is quite suiable for these parts.

What is claimed is:

1. In a portable handheld material broadcasting device, a housing having a manually engageable handle and providing a storage chamber for flowable granular material superimposed over a normally horizontally rotating impeller and having a discharge opening for gravitational flow of material from said chamber to said impeller, a valve member mounted for reciprocation across said opening for regulating said material flow and having closed, intermediate and full open positions, means biasing said valve member to closed position, a manually displaceable actuating member positioned adjacent said handle and having a connection for displacement of said valve member against the action of said biasing means, and being movable to closed, intermediate and full open positions corresponding with said closed, intermediate and to full open positions of said valve member, and manually adjustable means for limiting the opening movement of said valve member and corresponding position of said actuating member for setting the rate of flow of said material; the improvement comprising:
- a stop mounted on said handle and positioned to engage said actuator member when moved to its full open position and to support said actuator member when in such position against further displacement in a valve opening direction; and
- said connection being resiliently yieldable to permit forced displacement of said actuator member to said stop and without damage to said connection when said valve opening adjusting means is set at an intermediate valve open position.

2. The device of claim 1, said connection comprising a lever pivoted medially of its length and having one end connected to said valve member;
- a stem connecting the opposite end of said lever to said actuating member;
- said manually adjustable means comprising a cam positioned for engagement with said lever and being formed on selective rotation to an intermediate position to limit the movement of said lever and valve member and actuator member to their intermediate position; and
- said stem being formed of a material and being dimensioned to permit flexing without breaking upon forced movement of said actuator member to said stop when said cam is in its intermediate position.

* * * * *